United States Patent [19]

Haka

[11] Patent Number: 5,018,434
[45] Date of Patent: May 28, 1991

[54] SELF-ADJUSTING SERVO MECHANISM FOR ACTUATING A FRICTION BAND ASSEMBLY IN A PLANETARY GEAR SET

[75] Inventor: Raymond J. Haka, Rochester, Mich.

[73] Assignee: General Motors Corporation, Detroit, Mich.

[21] Appl. No.: 481,540

[22] Filed: Feb. 20, 1990

[51] Int. Cl.⁵ .................................................. F01B 9/00
[52] U.S. Cl. .................................... 92/29; 92/18; 92/19; 92/130 R; 188/77 R; 188/96 P
[58] Field of Search ............... 92/29, 18, 19, 130 R, 92/DIG. 4; 188/77 R, 196 P

[56] References Cited

U.S. PATENT DOCUMENTS

| | | | |
|---|---|---|---|
| 1,715,406 | 6/1929 | Christenson | 92/130 R |
| 3,115,220 | 12/1963 | Calle | 188/196 P |
| 3,353,637 | 11/1967 | Chana | 188/77 R |
| 3,605,959 | 9/1971 | Beck | 188/196 P |
| 4,387,901 | 6/1983 | Ritsema | 188/196 P |
| 4,388,986 | 6/1983 | Umezawa | 188/77 R |
| 4,881,453 | 11/1989 | Armstrong | 188/77 R |
| 4,907,491 | 3/1990 | Filip | 92/29 |

Primary Examiner—John T. Kwon
Assistant Examiner—Todd Mattingly
Attorney, Agent, or Firm—Donald F. Scherer

[57] ABSTRACT

The present invention is directed to a self-adjusting servo mechanism (10). The servo pin (30) presented from the servo mechanism (10) will protract sufficiently to effect operative engagement of a friction band assembly (13) with a rotating member (18) in a planetary gear set—even though the required axial displacement of the servo pin (30) during such protraction may exceed the axial displacement through which the servo pin (30) was previously retracted. The servo mechanism (10) is incorporated in a housing (20). The housing (20) presents a socket cavity (24) within which an actuating piston (33) is received for axial displacement. The servo pin (30) is supported by the housing (20) for axial reciprocation with the actuating piston (33), and a range locating device (35) is interposed between the servo pin (30) and the housing (20) to permit protraction of the servo pin (30) in response to displacement of the actuating piston (30) through whatever range of axial displacement is required for the servo pin (30) to operate the friction band assembly (13). The range locating device (35) also assures that the servo pin (30) will always retract through a predetermined range, irrespective of the distance through which the servo pin (30) had previously been retracted.

8 Claims, 4 Drawing Sheets

SELF-ADJUSTING SERVO MECHANISM FOR ACTUATING A FRICTION BAND ASSEMBLY IN A PLANETARY GEAR SET

TECHNICAL FIELD

The present invention relates generally to servo mechanisms employed in conjunction with planetary gear sets. More particularly, the present invention relates to servo mechanisms employed operatively to engage and release the one or more friction band assemblies of the type generally associated with planetary gear sets. Specifically, the present invention relates to a servo mechanism that is self-adjusting.

BACKGROUND OF THE INVENTION

Automatic vehicular transmissions are often provided with a planetary gear train which, includes one or more planetary gear sets, each of which may utilize braking bands and other torque control devices frictionally to engage and release selected members of each planetary gear set in order to obtain the desired function of the planetary gear train. The operator selects the drive range, neutral, forward or reverse, and the transmission automatically changes gear ratios in relation to the vehicle speed and the engine torque input, as permitted within the selected drive range.

A planetary gear set consists of a center or sun gear, an internal gear and a planetary carrier assembly which includes and supports the smaller planet gears or pinions. When the sun gear is held stationary and power is applied to the internal gear, the planetary gears rotate in response to the power applied to the internal gear and thus "walk" circumferentially about the fixed sun gear to effect rotation of the carrier assembly in the same direction as the direction in which the internal gear is being rotated.

When any two members of the planetary gear set rotate in the same direction and at the same speed, the third member is forced to turn at the same speed. For example, when the sun gear and the internal gear rotate in the same direction and at the same speed, the planet gears do not rotate about their own axes but rather act as wedges to lock that planetary gear set together so that it rotates as a unit.

Whenever the carrier assembly is restrained from spinning freely, and power is applied to either the sun gear or the internal gear, the planet gears act as idlers. In that way, the driven member is rotated in the opposite direction as the drive member. When, for example, the reverse drive range is selected, a band assembly may be actuated frictionally to engage the carrier assembly and restrain it against rotation so that torque applied to the sun gear will turn the internal gear in the opposite direction in order to reverse the rotational direction of the drive wheels, and thereby, reverse the direction of the vehicle itself. The present invention relates to servo mechanisms of the type employed to engage and release typical friction band assemblies.

Such a servo mechanism generally incorporates a piston assembly. The piston assembly is normally operated by the introduction of pressurized hydraulic fluid which displaces a piston to protract a servo pin the predetermined distance necessary operatively to effect engagement of the friction band assembly with the selected member of a planetary gear set. As the hydraulic fluid exits the piston assembly, the servo pin retracts to its original position and thereby allows the friction band assembly to release the selected member of the planetary gear set. The length of the servo pin is therefore selected so that it will operate the friction band assembly selectively to engage or release a rotating element in a planetary gear set in response to that axial displacement of the servo pin effected by the piston assembly.

In the configuration heretofore described, an actuating piston is included in the piston assembly, and the actuating piston axially reciprocates between its release position and its apply position. The distance between its release position and its apply position constitutes the throw or axial displacement of the actuating piston. The fixed connection between the actuating piston and the servo pin is such that when the actuating piston has reached its release position, the servo pin will be in its retracted position — which allows the friction band assembly to release the member of the planetary gear set upon which it operates. Conversely, when the actuating piston has reached its apply position the servo pin will be in its protracted position — which causes the friction band assembly to tighten onto the member of the planetary gear set upon which the friction band assembly operates. As the friction band assembly thus engages the selected member of the planetary gear set, rotation of that member is thereby precluded.

In many installations the length of the servo pin is selected for operation in a system wherein the relative position of all elements is fixed, but in some installations, a mechanical adjustment is available at the connection between the friction band assembly and the transmission casing from which the friction band assembly is supported. The mechanical adjustment of the friction band assembly constitutes a convenient means by which to establish optimum operation of the friction band assembly within the range of axial displacement available to the servo pin by reciprocation of the actuating piston. Such adjustments are highly desirable during assembly of the transmission, and — because of the normal wear incident to the friction band assembly — it has heretofore been required that periodic, manual adjustments be made during the operational life of the transmission. Unless some periodic adjustments are made, the quality of the shift effected by the transmission degrades. Even though periodic adjustments assure satisfactory operation of the transmission throughout its operational life, some owners simply procrastinate in attending to such maintenance and others don't wish to invest either the time or money required for even such routine maintenance.

SUMMARY OF THE INVENTION

It is, therefore, a primary object of the present invention to provide an improved servo mechanism that is self-adjusting.

It is another object of the present invention to provide an improved servo mechanism, as above, wherein the servo pin will protract sufficiently to operate a friction band assembly even though the required axial displacement of the servo pin during such protraction may exceed the axial displacement of the servo pin during retraction.

It is a further object of the present invention to provide an improved servo mechanism, as above, wherein axial displacement of the servo pin during retraction will always be equal to a predetermined distance, or range.

It is yet another object of the present invention to provide an improved servo mechanism, as above, wherein the self-adjusting aspect of the servo mechanism is effected by a range locating means which controls the distance or range, through which the servo pin will retract and automatically translates the span of that range axially along the servo pin so that the range through which the servo pin protracts and retracts will be maintained at an optimal distance in order more effectively to operate the friction band assembly.

It is an even further object of the present invention to provide an improved servo mechanism, as above, wherein the range locating means employs a frictional interface between the servo pin and a stop means.

These and other objects of the invention, as well as the advantages thereof over existing and prior art forms, which will be apparent in view of the following detailed specification, are accomplished by means hereinafter described and claimed.

In general, a servo mechanism embodying the concepts of the present invention is self-adjusting. To effect that design parameter, axial displacement of the servo pin during retraction is established as being equal to a predetermined, optimal range — irrespective of the distance traversed by displacement of the servo pin during protraction. A self-adjusting, range locating means not only controls the extent through which the servo pin retracts but is also employed to assure that protraction of the servo pin will be equal to the desired range or distance, through which the servo pin was displaced during retraction, plus any incremental distance required to accommodate wear between the friction band assembly and the planetary gear member with which the friction band assembly co-acts.

An exemplary construction for a self-adjusting servo mechanism adapted to accomplish the foregoing results may be incorporated in a housing. The housing presents a socket cavity within which an actuating piston is received for axial displacement. A servo pin is supported by the housing for axial reciprocation, and the servo pin is operatively connected to the actuating piston. A range locating means is interposed between the servo pin and the housing. The range locating means assures that the servo pin will retract through the predetermined distance selected as the range for axial displacement of the servo pin, and also permits the servo pin to protract through that same distance plus any incremental distance required to accommodate wear. As such, the servo mechanism is self-adjusting.

One exemplary servo mechanism embodying the concepts of the present invention is shown by way of example in the accompanying drawings and is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
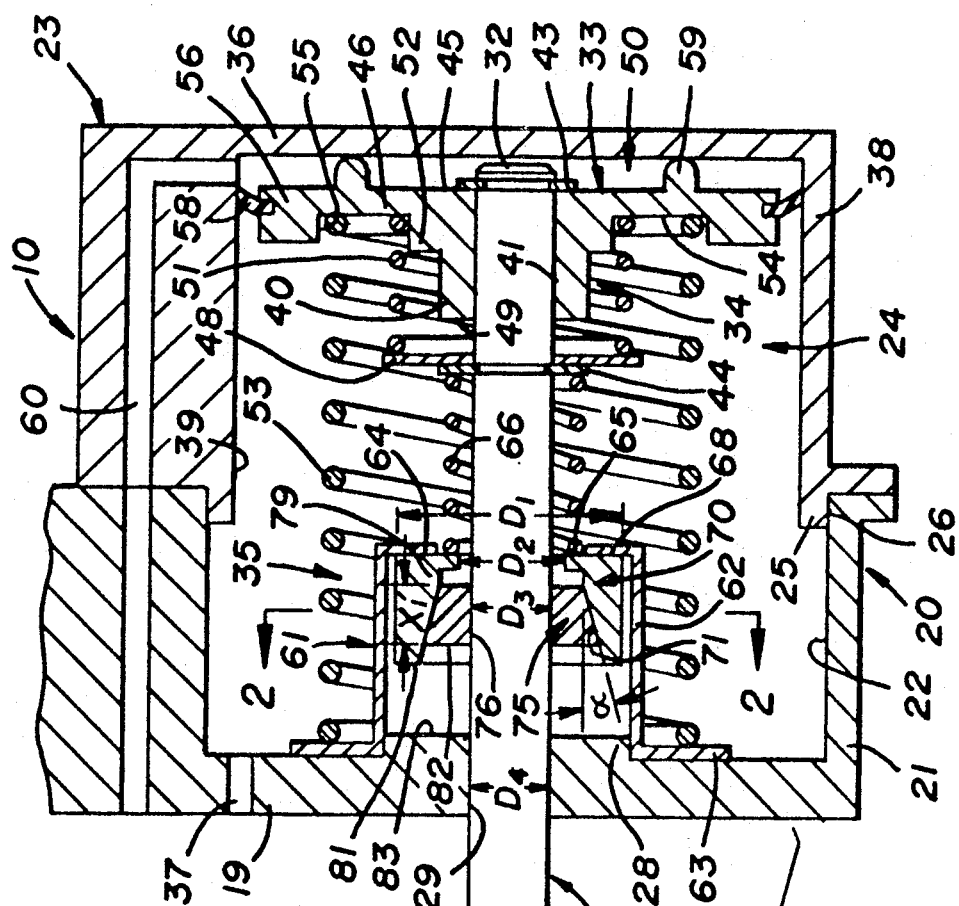
FIG. 1 is a cross-sectional view of a servo mechanism embodying the concepts of the present invention, with the servo pin being depicted in its maximum retracted position.

One representative form of a servo mechanism embodying the concepts of the present invention is designated generally by the numeral 10 on the accompanying drawings. The representative servo mechanism 10 may be operatively secured to, or it may be integrally incorporated within, the casing 11 of a vehicular transmission. The mechanism of one or more planetary gear sets is housed within the cavity 12 located interiorly of the casing 11. Inasmuch as planetary gear sets are well known in the art, only that element of the planetary gear set to which the servo mechanism 10 is operatively connected has been depicted in the drawings, and then schematically.

With reference to FIG. 1, a friction band assembly 13 is depicted with one end portion 14 thereof being secured to a relevant portion 11A of the transmission casing 11. Although the necessity for periodic, manual adjustments has been obviated by the present invention, it may be desirable to provide a means by which to facilitate installation, and initial set-up of the friction band assembly 13 during construction of the transmission. Accordingly, the end portion 14 of the friction band assembly 13 may be adjustably secured, as by the set screw 15, to portion 11A of the transmission casing 11. In the alternative, a pin member may be used to replace the screw 15. In this instance, the pin would be press fitted to the transmission casing 11.

The other end portion 16 of the friction band assembly 13 may be operatively connected to the servo mechanism 10 in a manner well known to the art and therefore not detailed or further explained. Operation of the friction band assembly 13 by the servo mechanism 10, as is generally hereinafter more fully explained, selectively engages a desired member 18 in the planetary gear set to preclude rotation thereof or releases the member 18 to permit rotation thereof. Typically, the servo mechanism 10 would selectively operate the friction band assembly 13 to co-act with the carrier assembly which supports the pinions of a planetary gear set. Member 18, as depicted, may thus be schematically representative of a carrier assembly in a planetary gear set.

Continuing with specific reference to FIG. 1, a transverse base wall 19 is incorporated in a servo housing 20. The housing 20 may be operatively secured to the transmission case 11, or it may be integrally included within the casing 11, as is well known to the art. In either event, a pedestal 21 may extend outwardly from the transverse base wall 19. A cylindrical surface 22 preferably defines the radially interior perimeter of the pedestal 21. A cover or closure cap 23 cooperates with the pedestal 21 to complete the housing 20 and to define a socket cavity 24 interiorly of the housing 20. To stabilize the connection of the cover 23 to the pedestal 21, and to assist in sealing the socket cavity 24 from atmosphere, an annular extension 25 may extend axially outwardly from the cover 23. The cylindrical outer surface 26 on the extension 25 is adapted matingly to engage the cylindrical interior surface 22 of the pedestal 21. Suitable, well known sealing and connecting means, not shown, may be employed between the housing 20 and the cover 23.

A boss 28 extends axially inwardly of the socket cavity 24 from the transverse base wall 19 of the housing 20, and a pilot bore or opening 29 penetrates the boss 28 and base wall 19. The pilot bore 29 is aligned, not only with the axis of the socket cavity 24, but also with the second end portion 16 of the friction band assembly 13. A servo pin 30 is supported by the housing 20. Specifically, the servo pin 30 may be received within the pilot bore 29 for sliding, axial reciprocation. That end 31 of the servo pin 30 disposed exteriorly of the housing 20 is operatively connected to end portion 16 of the friction band assembly 13. The opposite end portion 32 of the servo pin 30 is operatively connected to an actuating piston 33 by a lost motion connection 34. A range translating and locating means 35, as will be hereinafter more fully described, interacts between the servo pin 30 and the housing 20.

An exhaust passage 37 is provided in the wall 19 to prevent fluid from collecting in the cavity 24 between the piston 23 and the wall 19. This exhaust passage 37 permits fluid, that inadvertently leaks by the piston 23 during actuation of the servo mechanism 10, to be exhausted from the cavity. In the alternative, a slight clearance can be provided between the pin 30 and the pilot bore 29 to establish an exhaust passage for any fluid leakage.

The cover 23 may be configured with a transverse end wall 36 conjoined to a perimeter wall 38. The hollow interior of both the cover 23 and the pedestal 21 combine to form the socket cavity 24. The interior surface 39 of at least that portion of the socket cavity 24 circumscribed by the cover 23 is preferably cylindrical to define the surface along which the actuating piston 33 may axially reciprocate.

The actuating piston 33 is secured to the second end portion 32 of the servo pin 30. Specifically, the hub portion 40 of the actuating piston 33 may be penetrated by a bore 41 which slidably engages the servo pin for limited axial displacement. A seal 42 is received within a radially inwardly facing groove which extends circumferentially about the bore 41. The seal 42 precludes the passage of hydraulic fluid between the servo pin 30 and the hub portion 40 of the actuating piston 33.

The limited axial displacement permitted between the servo pin 30 and the actuating piston 33 effects the hereinafter more fully described lost motion connection 34. Specifically, a pair of axially spaced grooves which circumscribe the servo pin 30 receive first and second retaining rings 43 and 44, respectively. The first retaining ring 43 is located in close proximity to the second end portion 32 of the servo pin 30. The head surface 45 on the web wall 46 of the actuating piston 33 is adapted to engage the first retaining ring 43 during certain operational stages of the servo mechanism 10. A reaction ring 48 is supported against the second retaining ring 44 and as such is disposed between the opposed end surface 49 on the hub portion 40 of the actuating piston 33 and the second retaining ring 44.

As depicted in the several figures, the axial span between the head surface 45 and the end surface 49 is modestly less than the axial dimension between the first and second retaining rings 43 and 44 to effect the desired lost motion for the connection 34 between the servo pin 30 and the actuating piston 33.

As may now be appreciated, that portion of the socket cavity 24 between the head surface 45 on the actuating piston and the transverse end wall 36 of the cover 23 comprises a pressure chamber 50.

A compression type cushion spring 51 is interposed between the web wall 46 of the actuating piston 33 and the reaction ring 48. To stabilize, and locate, the cushion spring 51, the hub portion 40 of the actuating piston 33 may present a transitional shoulder 52 that is of sufficient diameter to fit within the cushion spring 51 in order to preclude lateral displacement thereof. A return spring 53 is disposed radially outwardly of the cushion spring 51. A first end of the return spring 53 co-operatively interacts against the transverse base wall 19 of the housing 20. The second, or opposite, end of the return spring 53 engages an opposed surface 54 presented from the underside of the web wall 46 on the actuating piston 33. An offset 55, which defines the intersection between the web wall 46 and a peripheral skirt portion 56 of the actuating piston 33, circumscribes the second end of the return spring 53 to maintain alignment thereof.

The peripheral skirt portion 56 of the actuating piston 33 is provided with a radially outwardly directed, circumferential recess to receive a seal 58 which cooperates with the cylindrical interior surface 39 of the cover 23 to preclude the passage of hydraulic fluid between the skirt portion 56 and the cover 23. Any fluid that inadvertently leaks by the seal 58 is exhausted through passage 37.

A spacer 59, comprised of a plurality of circumferentially spaced protuberances extends axially outwardly from the head surface 45 on the web wall 46 of the actuating piston 33 to engage the transverse end wall 36 of the cover 23 in order to determine the closest proximity to which the actuating piston 33 may approach the transverse end wall 36 of the cover 23, and thereby also the minimum size of the pressure chamber 50.

A feed line, identified generally by the numeral 60, communicates between a source (not shown) of pressurized hydraulic fluid and the pressure chamber 50.

Turning now to a detailed description of the range locating and positioning means 35, a stanchion 61 has an annular body portion 62 which extends axially outwardly from a radially outwardly extending, planar foot flange 63 which is attached to the transverse base wall 19 of the housing 20. In spaced axial relation from the foot flange 63, the body portion 62 terminates in a stop flange 64 which extends radially inwardly therefrom. The radially innermost extent of the stop flange 64 presents a circular, inner edge 65 which lies in spaced concentricity relative to the servo pin 30 to permit a tickler spring 66, which is disposed concentrically about the servo pin 30, to extend between the servo pin 30 and the edge 65 of the foot flange 64. The first end of the tickler spring 66 engages the second retaining ring 44, and the second, or opposite, end of the tickler spring 66 engages the end wall 68 on a locking ring 70 which encircles the servo pin 30 to be freely movable axially therealong.

The locking ring 70 is also freely movable axially within the interior of the stanchion 61, but the outer diameter $D_1$ of the locking ring 70 is greater than the inner diameter $D_2$ of the circular edge 65 of the stop flange 64 so that the locking ring 70 can not move past the stop flange 64. The locking ring 70 also presents a radially inwardly directed, conical surface 71.

Figure 2:
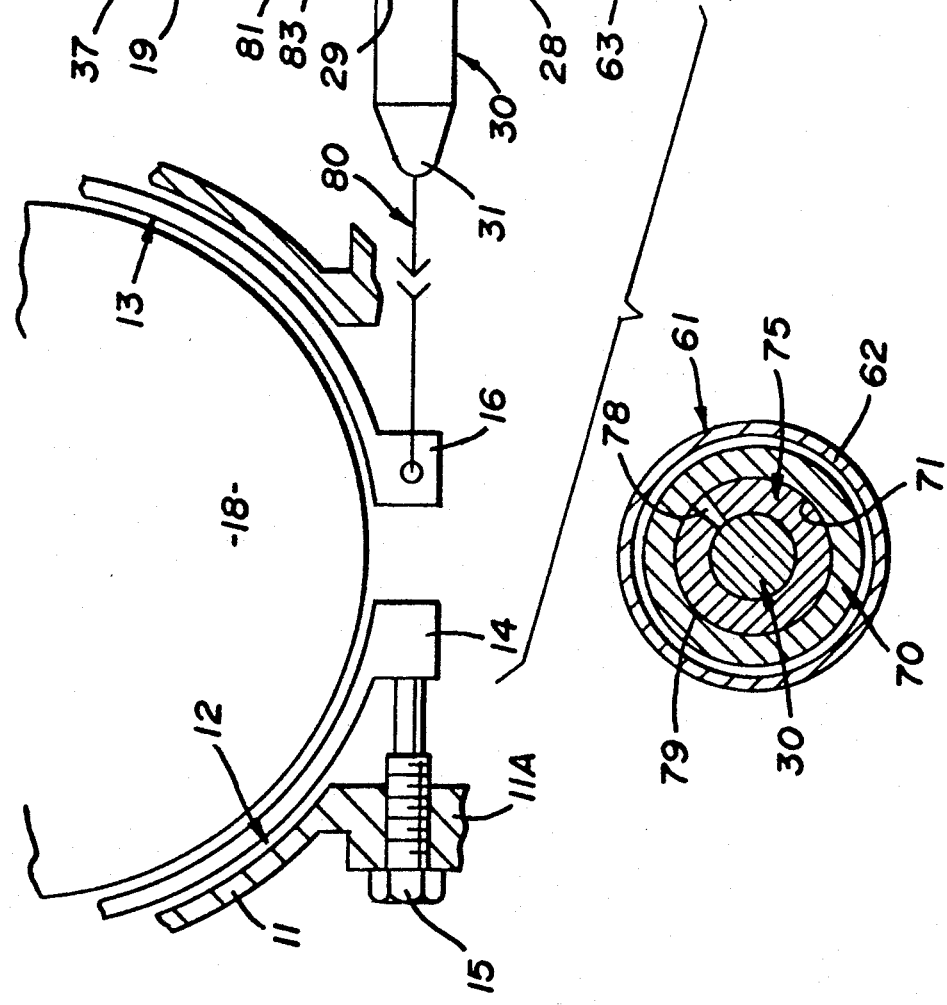
FIG. 2 is a transverse section taken substantially along line 2—2 of FIG. 1.

A wedging ring 75 is also included in the range locating and position means 35. The wedging ring 75 is also substantially annular and presents a substantially cylindrical interior surface 76 which lies contiguous to, and engages, the servo pin 30. Rather than being a continuous uninterrupted annulus, however, the wedging ring 75 has an annular discontinuity 78 (FIG. 2) which allows the wedging ring 75 circumferentially to expand and contract. When the wedging ring 75 is unstressed, the inner diameter $D_3$ of the wedging ring 70 is slightly less than the outer diameter $D_4$ of the servo pin 30 to permit the wedging ring 75 frictionally to engage the servo pin 30 with sufficient force that the wedging ring 75 will reciprocate with the servo pin 30 but yet be able to move axially with respect to, and along, the servo pin 30 when subjected to an axially directed blocking force.

The wedging ring 75 also presents a radially outwardly directed conical surface 79, which is disposed in opposition to, and is cooperatively engageable by, the conical surface 71 on the locking ring 70, as will be hereinafter more fully discussed. However, it must be understood that for the conical surfaces to effect their intended purpose, it will be necessary that they both be inclined at an angle alpha relative to the axis 80 of the servo pin 30. The angle alpha is chosen so that the coefficient of friction between the conical surfaces 71 and 79 is greater than the tangent of the angle alpha.

The axial dimension $X_1$ of the wedging ring 75 is selected so that when the conical surfaces 71 and 79 are engaged, the rim 81 of the locking ring 70 will serve as a reaction means which extends axially beyond the end wall 82 of the wedging ring 75, as depicted in FIG. 1. The rim 81 of the locking ring 70 is disposed in opposition to an anvil surface 83 presented from the boss 28 so that the rim 81 may engage the anvil surface 83 an effect the hereinafter described purpose of the reaction means.

OPERATION

The disposition depicted in FIG. 1 results when the pressure chamber 50 is either empty or does not contain sufficient hydraulic fluid to have effected translation of the actuating piston 33 against the biasing action of the return spring 53. As such, the return spring 53 has biased the spacer 59 extending axially from the head surface 45 of the actuating piston 33 into engagement with the transverse wall 36 of the cover 23. Concurrently, the cushion spring 51, which is stronger than the tickler spring 66, has biased the first retaining ring 43 against the head surface 45 on the actuating piston 33. The end portion 32 of the servo pin 30, located interiorly of the socket cavity 24, may be disposed in close proximity to the transverse end wall 36 of the cover 23, and as such, the servo pin 30 is in its fully retracted position. This condition exists when the servo mechanism 10 is first installed and represents the situation wherein the apply position of the actuating piston 33 is determined by engagement of the spacer 59 with the transverse end wall 36 of the cover 23 rather than by operation of the range locating means 35. With the components of the servo mechanism 10 so configured, the lost motion connection 34 is disposed to prevent abrupt protraction of the servo pin 30, as will be hereinafter more fully described.

In order to actuate the servo mechanism 10, pressurized hydraulic fluid is introduced, via feed line 60, into pressure chamber 50. As the volume of hydraulic fluid within the pressure chamber 50 increases, the actuating piston 33 is displaced to compress both the return spring 53 and the cushion spring 51. This displacement of the actuating piston 33 forces the end surface 49 on the hub portion 40 of the actuating piston 33 against the reaction ring 48. The energy necessary to compress the springs 51 and 53 cushions the application of the force applied by the actuating piston 33 against the reaction ring 48 to initiate protraction of the servo pin 30. The continued admission of pressurized hydraulic fluid through the feed line 60 into the pressure chamber 50 displaces the actuating piston 33 to continue protraction of the servo pin 30 until, as represented in FIG. 3, the friction band assembly 13 has firmly tightened onto, and has thereby precluded rotation of, the member 18 in the planetary gear set.

Figure 3:
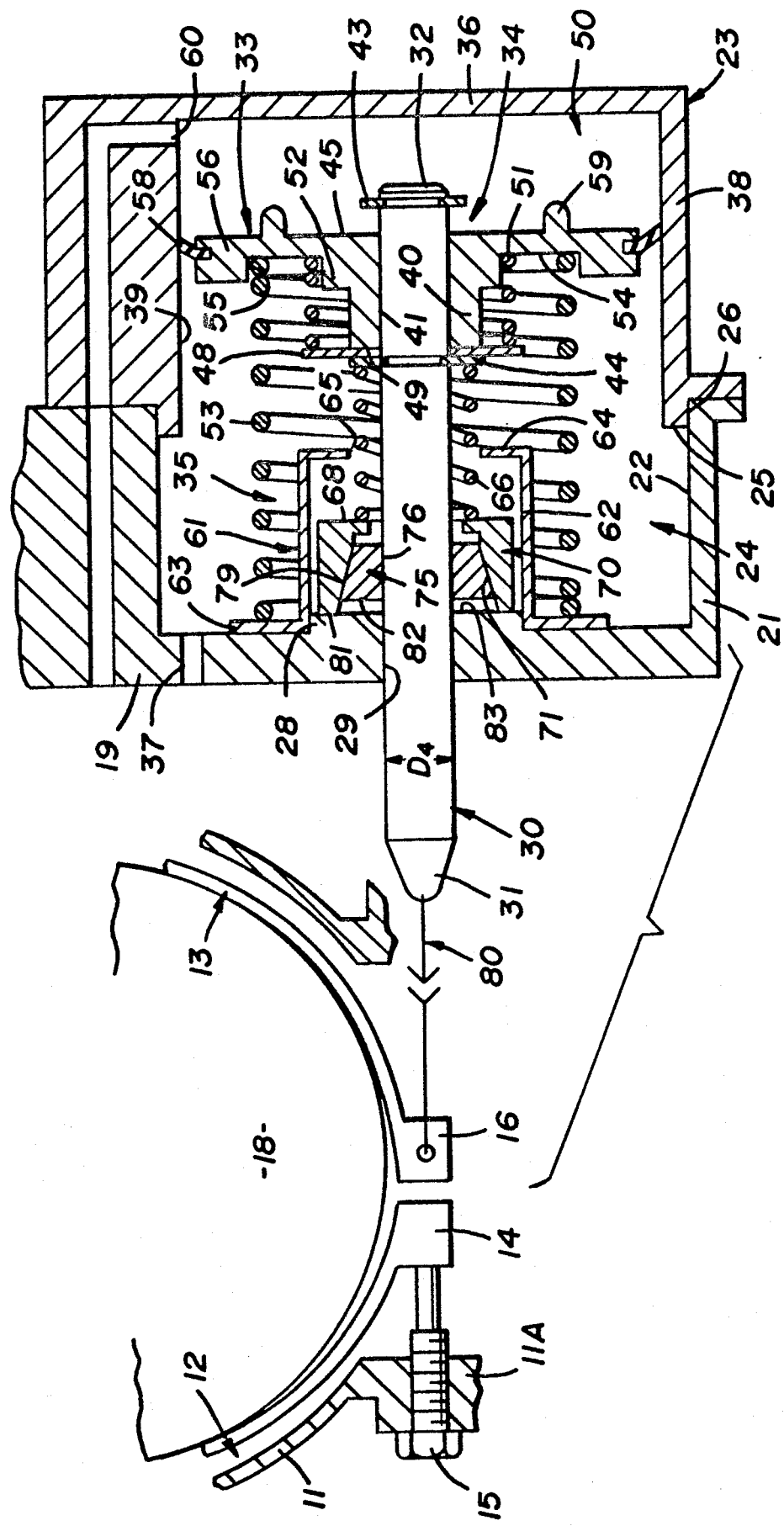
FIG. 3 is a view similar to FIG. 1, but depicting the servo pin protracted through a distance which is equal to that range through which the servo pin is permitted to be retracted by the servo mechanism.

Should the friction band assembly 13 be effectively tightened onto the member 18 of the planetary gear set by that protraction of the servo pin 30 depicted in FIG. 3, there will be no need for the range locating means 35 to have translated the displacement range of the servo pin 30. As such, the disposition of the actuating mechanism 10 represented by FIG. 3 represents the initial apply position of the actuating piston 33 before any self-adjustment of the servo mechanism 10 has been accomplished. Thus, when it is thereafter desired to permit rotation of the member 18, hydraulic fluid is permitted to exit from the pressure chamber 50 through the feed line 60, and the return spring 53 biases the actuating piston 33 to its initial release position depicted in FIG. 1. This displacement of the actuating piston 33 in combination with the biasing action of the cushion spring 51 not only retracts the servo pin 30 but also returns it to that position relative to the actuating piston 33 represented by FIG. 1.

Under normal conditions, operation of the friction band assembly 13 precludes rotation of the planetary gear member 18 when the components of the servo mechanism 10 are disposed, as depicted in FIG. 3. As has now been explained, displacement of the actuating piston 33 from its initial release position (FIG. 1) to its initial apply position (FIG. 3), merely requires admission of hydraulic fluid through feed line 60 into pressure chamber 50 to protract the servo pin 30 a sufficient distance to operate the friction band assembly 13 and preclude rotation of the member 18.

However, should any relative wear between the co-acting friction band assembly 13 and the member 18 of the planetary gear set have occurred, the range locating means 35 will effect whatever adjustment is required automatically and progressively, to protract the servo pin 30 to the extent necessary to accommodate the aforesaid wear and assure that the friction band assembly 13 will adequately tighten onto the member 18.

Figure 4:
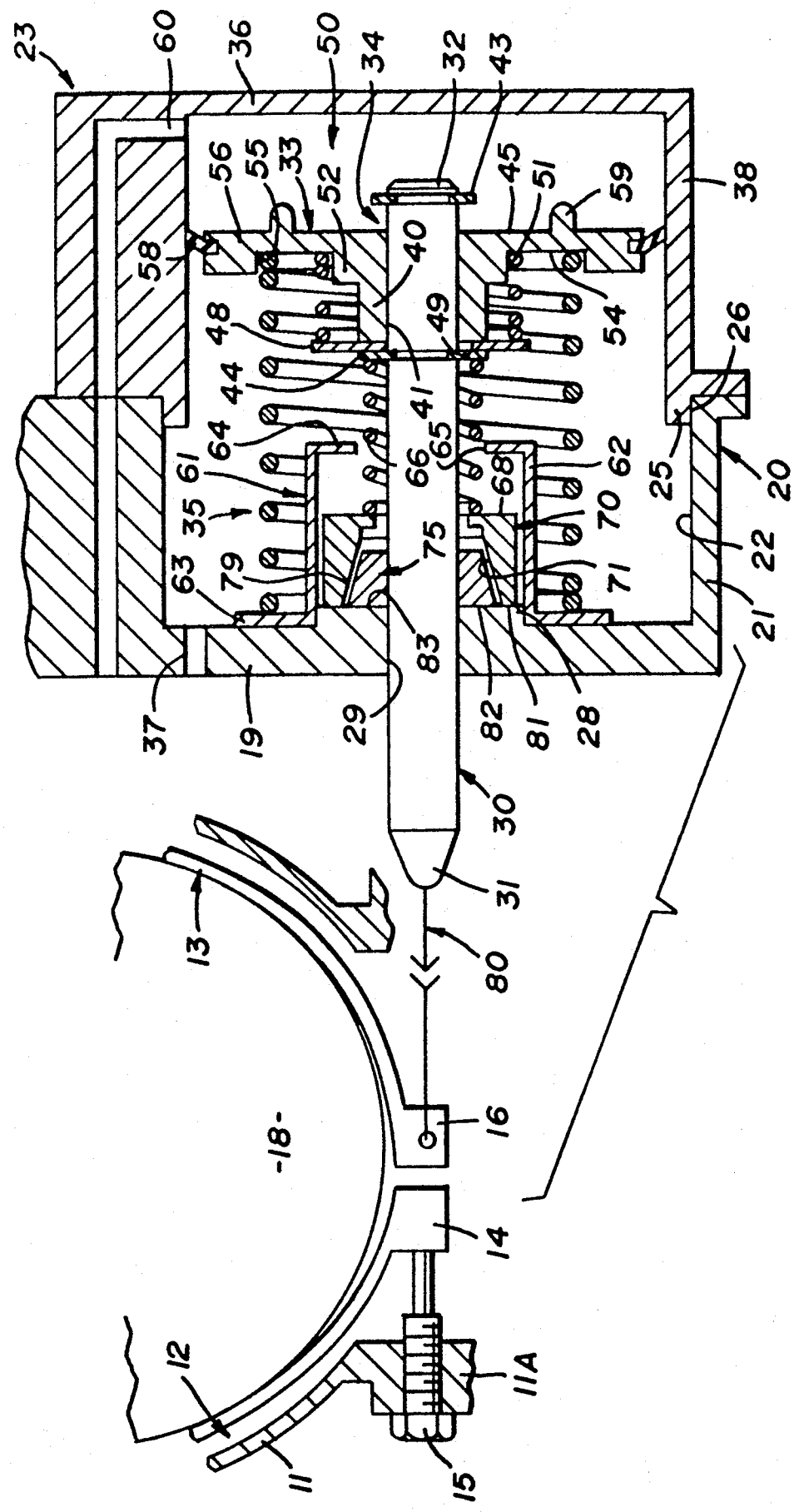
FIG. 4 is a view similar to FIG. 3, but depicting the servo pin protracted through not only a distance equal to the range through which the servo pin can be retracted but also whatever further, incremental distance is required for the servo pin effectively to operate the friction band assembly; and, FIG. 5 is a view similar to FIG. 1 in that it depicts the servo pin having been retracted through the same axial distance, or range, depicted in FIG. 1, but with that range having been axially translated relative to the servo pin, and the mechanism operatively associated therewith, by virtue of the range locating means.

With reference then to FIG. 4, it will be seen that should the servo pin 30 need to be protracted further to secure the friction band assembly 13 tightly onto the member 18 of the planetary gear set, the actuating piston 33 continues to be displaced by the pressurized hydraulic fluid admitted to the pressure chamber 50 through the feed line 60. This continued displacement of the actuating piston 33 disengages the frictional interface between the conical surfaces 79 and 71 on the wedging ring 75 and locking ring 70, respectively. However, the slightly lesser inner diameter $D_3$ of the wedging ring 75 in comparison to the outer diameter $D_4$ of the servo pin 30 assures that the wedging ring 75 will be displaced with the continued protraction of the servo pin 30, until the end wall 82 of the wedging ring 75 has been moved into engagement with the anvil surface 83 on the boss 28, as represented in FIG. 4. Continued displacement of the actuating piston 33 after the wedging ring 75 engages the boss 28 effects the application of an axial force against the end wall 82 on the wedging ring 75 which permits the servo pin 30 to move axially with respect to the stationary wedging ring 75, and that relative movement between the servo pin 30 and the wedging ring 75 continues until the servo pin 30 has been axially displaced a sufficient distance for the friction band assembly 13 to have locked onto the member 18 such that the member 18 cannot rotate.

When the continued operation of the planetary gear set requires that member 18 be free to rotate, the pressurized hydraulic fluid is permitted to exit from the pressure chamber 50, also through the feed line 60, and the return spring 53 once again biases the actuating piston 33 toward its release position. The combined effect of the return spring 53 and the cushion spring 51 moves the head surface 45 on the web wall 46 of the actuating piston 33 into engagement with the first retaining ring 43, such that the continued effect of the return spring 53 is to retract the servo pin 30.

As the servo pin 30 retracts from the position depicted in FIG. 4, the wedging ring 75 is carried with the servo pin 30 by the frictional engagement between those two components. The tickler spring 66 maintains the locking ring 70 in the position depicted in FIG. 4 to be engaged by the wedging ring 75 at the earliest possible moment during retraction of the servo pin 30. With the locking and wedging rings 70 and 75 so disposed, translation of the wedging ring 75 with the servo pin 30 brings the conical surface 79 on the wedging ring 75 into engagement with the conical surface 71 on the locking ring 70.

Because of the fact that the two conical surfaces 79 and 71 are each inclined at an angle alpha which is chosen so that the tangent thereof is less than the coefficient of friction between the two surfaces 79 and 71, the frictional interface therebetween will not apply an axial force to the wedging ring 75 sufficient to slide the wedging ring 75 relative to the servo pin 30, but rather will effect a self-energizing frictional lock between the wedging and locking rings 75 and 70, respectively, which will secure the wedging ring 75 more firmly against the servo pin 30. As should now be apparent, the annular discontinuity 78 with which the wedging ring 75 is provided allows the wedging ring 75 to contract circumferentially in response to engagement with the locking ring 70 in order to lock the wedging ring 75 onto the servo pin 30.

Figure 5:
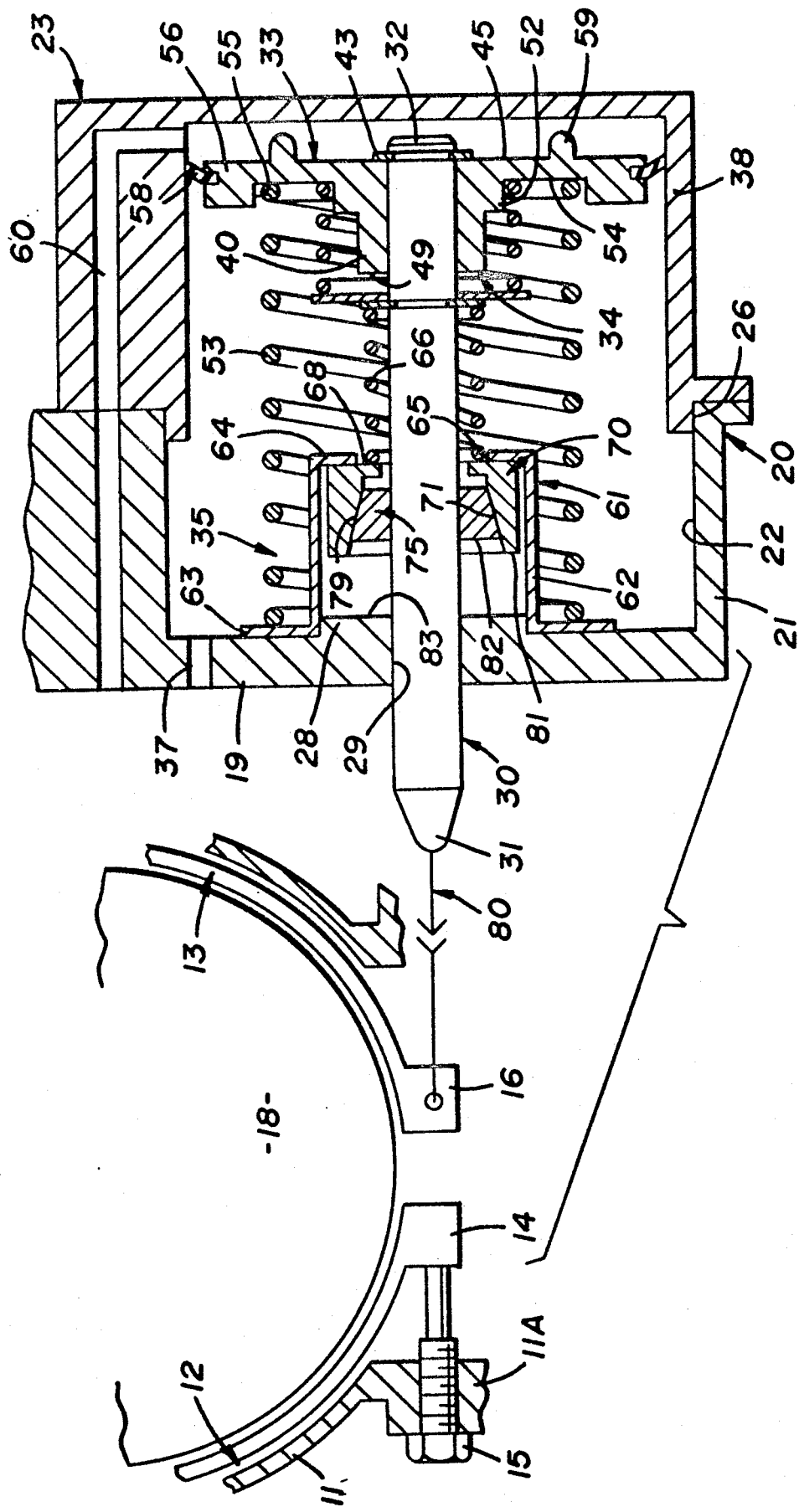

Continued exiting of the hydraulic fluid from the pressure chamber 50 after the frictional interface between the locking and wedging rings 70 and 75 has been effected will also compress the tickler spring 66 so that the locking and wedging rings 70 and 75 will be displaced as one with the axial retraction of the servo pin 30 until the end wall 68 on the locking ring 70 engages the stop flange 64 on the stanchion 61. This determines the self-adjusted release position of the actuating piston 33, as depicted in FIG. 5, and subsequent cycles of the servo mechanism 10 will be initiated when the actuating piston 33 is in its self-adjusted release position.

Thus, no matter what protraction is required, the actuating piston 33 need merely be displaced from its self-adjusted release position to whatever apply position is required to effect operation of the friction band assembly 13. The range locating means 35 will accommodate whatever further protraction is required of the servo pin 30. Moreover, irrespective of what axial extension is required of the servo pin 30, retraction of the servo pin 30 will always be equal to the axial distance between the anvil surface 83 and the stop flange 64. As such, the retraction of the servo pin 30 will also be equal to the displacement of the actuating piston 33 as it moves from the apply position — defined by that location required to effect operation of the friction band assembly — to the self-adjusted release position — as herein described.

As should now be apparent, the present invention not only provides a self-adjusting servo mechanism for the operation of a friction band assembly but also accomplishes the other objects of the present invention.

The embodiments of the invention in which an exclusive property or privilege is claimed are defined as follows:

1. A self-adjusting servo mechanism comprising: a housing; said housing presenting a socket cavity; an actuating piston received within said socket cavity for axial reciprocation; a servo pin slidably disposed in said housing for axial retraction and protraction; means operatively connecting said servo pin to said actuating piston; and, a range locating means operative between said servo pin and said housing automatically to provide for retraction through a predetermined range and for protraction through at least said predetermined range, said range locating means comprising: a locking ring encircling said servo pin and being freely movable with respect thereto; an annularly discontinuous wedging ring encircling, and contiguously engaging, said servo pin; a first, radially inwardly directed, conical surface presented from said locking ring; a second, radially outwardly directed, conical surface presented from said wedging ring; said first and second conical surfaces effecting a frictionally locking interface during retraction of said servo pin.

2. A self-adjusting servo mechanism, as set forth in claim 1, further comprising: means to disengage said frictional interface when said servo pin is protracted beyond a predetermined distance constituting said range; and, means to re-engage said frictional interface upon retraction of said servo pin.

3. A self-adjusting servo mechanism, as set forth in claim 1, incorporating means to engage, disengage and re-engage said frictional interface, said means further comprising: a stanchion supported from said housing to present a stop to be engaged by said locking ring upon retraction of said servo pin; an anvil surface presented from said housing; means presented from said locking ring to engage said anvil surface upon protraction of said servo pin beyond said predetermined range; said wedging ring also engaging said anvil surface to reposition said wedging ring along the axial extent of said servo pin when said servo pin is protracted axially beyond said predetermined range.

4. A self-adjusting servo mechanism, as set forth in claim 3, further comprising: a return spring interposed between said housing and said actuating piston.

5. A self-adjusting servo mechanism, as set forth in claim 4, further comprising: a cushion spring acting to protract said servo pin with respect to said actuating piston.

6. A self-adjusting servo mechanism, as set forth in claim 5, further comprising: a tickler spring interposed between said actuating piston and said locking ring.

7. A self-adjusting servo mechanism comprising: a housing; said housing presenting a socket cavity; a pilot bore provided in said housing; said pilot bore being axially aligned with said socket cavity; a servo pin received within said pilot bore for axial reciprocation; an actuating piston received within said socket cavity for axial reciprocation; said actuating piston having a head surface; a pressure chamber provided within said housing; said head surface on said actuating piston exposed to said pressure chamber; a locking ring encircling said servo pin and being freely movable with respect thereto; an annularly discontinuous wedging ring encircling, and contiguously engaging, said servo pin; a first, radially inwardly directed, conical surface presented from said locking ring; a second, radially outwardly directed, conical surface presented from said wedging ring; said first and second conical surfaces effecting a frictionally locking interface during retraction of said servo pin.

8. A self-adjusting servo mechanism comprising: a housing; said housing presenting a socket cavity; an opening provided in said housing; said opening being axially aligned with said socket cavity; a servo pin received within said opening for axial reciprocation; an actuating piston received within said socket cavity for axial reciprocation; said actuating piston having a head surface; a pressure chamber provided within said housing; said head surface on said actuating piston exposed to said pressure chamber; a locking ring encircling said servo pin and being freely movable with respect thereto; an annularly discontinuous wedging ring encircling, and contiguously engaging, said servo pin; a first, radially inwardly directed, conical surface presented from said locking ring; a second, radially outwardly directed, conical surface presented from said wedging ring; said first and second conical surfaces effecting a frictionally locking interface during retraction of said servo pin; a stanchion supported from said housing to present a stop surface to be engaged by said locking ring upon retraction of said servo pin; an anvil surface presented from said housing; means presented from said locking ring to engage said anvil surface upon protraction of said servo pin beyond said predetermined range; said wedging ring also engaging said anvil surface to reposition said wedging ring along the axial extent of said servo pin when said servo pin is protracted axially beyond said predetermined range; a return spring interposed between said housing and said actuating piston; a cushion spring acting to protract said servo pin with respect to said actuating piston; and, a tickler spring interposed between said actuating piston and said locking ring.

* * * * *